(12) United States Patent
Ohashi et al.

(10) Patent No.: US 12,122,360 B2
(45) Date of Patent: *Oct. 22, 2024

(54) MANAGER, ELECTRONIC CONTROL UNIT, SYSTEM, CONTROL METHOD, NON-TRANSITORY STORAGE MEDIUM, AND VEHICLE

(71) Applicants: TOYOTA JIDOSHA KABUSHIKI KAISHA, Toyota (JP); ADVICS CO., LTD., Kariya (JP)

(72) Inventors: Hideki Ohashi, Chiryuu (JP); Kazuki Miyake, Okazaki (JP); Akitsugu Sakai, Toyota (JP); Shota Higashi, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 311 days.

This patent is subject to a terminal disclaimer.

(21) Appl. No.: 17/590,967

(22) Filed: Feb. 2, 2022

(65) Prior Publication Data
US 2022/0274587 A1    Sep. 1, 2022

(30) Foreign Application Priority Data
Feb. 26, 2021    (JP) .................... 2021-030257

(51) Int. Cl.
| | |
|---|---|
| *B60W 30/06* | (2006.01) |
| *B60W 10/04* | (2006.01) |
| *B60W 10/10* | (2012.01) |
| *B60W 10/18* | (2012.01) |
| *B60W 30/08* | (2012.01) |

(Continued)

(52) U.S. Cl.
CPC ...... *B60W 30/06* (2013.01); *B60W 30/18109* (2013.01); *B60W 40/09* (2013.01); *B60W 60/001* (2020.02)

(58) Field of Classification Search
None
See application file for complete search history.

(56) References Cited

U.S. PATENT DOCUMENTS

| | | | |
|---|---|---|---|
| 9,855,932 | B2 | 1/2018 | Kato |
| 2017/0029026 | A1 | 2/2017 | Okuda et al. |

(Continued)

FOREIGN PATENT DOCUMENTS

| | | |
|---|---|---|
| JP | 2017-030472 A | 2/2017 |
| JP | 2020-032894 A | 3/2020 |

OTHER PUBLICATIONS

Mar. 28, 2024 Office Action issued in U.S. Appl. No. 17/591,112.
Jul. 31, 2024 Notice of Allowance issued in U.S. Appl. No. 17/591,112.

*Primary Examiner* — Jaime Figueroa
*Assistant Examiner* — Atticus A Cameron
(74) *Attorney, Agent, or Firm* — Oliff PLC

(57) ABSTRACT

A manager installed in a vehicle includes one or more processors. The one or more processors are configured to receive a plurality of kinematic plans and identification information of a plurality of advanced driver assistance system applications from the advanced driver assistance system applications, and receive a control status indicating an execution state of control in each of the advanced driver assistance system applications. The one or more processors are configured to perform a first arbitration that arbitrates the kinematic plans.

4 Claims, 2 Drawing Sheets

(51) Int. Cl.
*B60W 30/12* (2020.01)
*B60W 30/14* (2006.01)
*B60W 30/18* (2012.01)
*B60W 40/09* (2012.01)
*B60W 50/00* (2006.01)
*B60W 60/00* (2020.01)

(56) References Cited

U.S. PATENT DOCUMENTS

| | | | |
|---|---|---|---|
| 2018/0375881 A1* | 12/2018 | Wada | H04W 4/48 |
| 2020/0070849 A1* | 3/2020 | Suzuki | B60W 10/20 |
| 2022/0266819 A1 | 8/2022 | Itoh et al. | |

* cited by examiner

MANAGER, ELECTRONIC CONTROL UNIT, SYSTEM, CONTROL METHOD, NON-TRANSITORY STORAGE MEDIUM, AND VEHICLE

CROSS-REFERENCE TO RELATED APPLICATION

This application claims priority to Japanese Patent Application No. 2021-030257 filed on Feb. 26, 2021, incorporated herein by reference in its entirety.

BACKGROUND

1. Technical Field

The present disclosure relates to a manager installed in a vehicle, an electronic control unit, a system, a control method, a non-transitory storage medium, and a vehicle.

2. Description of Related Art

In recent years, a plurality of advanced driver assistance system (ADAS) applications that realize autonomous driving functions, such as autonomous driving and automatic parking, have been implemented in vehicles. Japanese Unexamined Patent Application Publication No. 2020-032894 (JP 2020-032894 A) discloses a control device (manager) that receives requests output from each of the ADAS applications, arbitrates a plurality of requests received from the ADAS applications, and based on the arbitration results, outputs a request for driving an actuator (steering device, brake device, etc.).

One of the ADAS applications is an automatic parking application that realizes the functions of automatic parking of a vehicle. In this automatic parking application, when there is input of operations for changing a shift range (shift operation) as a request from a driver while the automatic parking function is operating, the automatic parking control is immediately terminated without responding to this shift operation.

Further, one of the ADAS applications is a parking support brake (PKSB) application that realizes functions of supporting braking operations at low speeds, such as parking, for example. In this PKSB application, when there is a shift operation performed by the driver during operations of the PKSB functions, the operation state of the PKSB functions is maintained while responding to the shift operation.

SUMMARY

In a system configuration in which the ADAS application and the PKSB application are individually implemented in separate electronic control units (ECUs), identification information (application ID) is output from the respective ECUs that enables the ADAS application received along with the requests to be uniquely identified, even when the PKSB functions operate after the automatic parking functions are already operating, for example. Accordingly, the manager can comprehend that both the automatic parking functions and the PKSB functions are in operation by receiving each application ID. Thus, in this case, even when there is a shift operation performed by the driver when both the automatic parking functions and the PKSB functions are operating, the manager is capable of performing arbitration in which priority is given to the automatic parking function, and the shift operation is not responded to.

However, in a system configuration in which the ADAS application and the PKSB application are implemented in the same ECU, when the PKSB functions operate after the automatic parking functions are already in operation, only the request and the application ID of the PKSB functions that are the latest output are output from this ECU. Accordingly, although the manager can comprehend that the PKSB functions are operating, based on the received application ID, whether the automatic parking function is operating or has ended cannot be determined. Hence, in this case, when there is a shift operation performed by the driver while both the automatic parking functions and the PKSB functions are in operation, there is concern that the manager will perform arbitration responding to the shift operation.

The present disclosure provides a manager, an electronic control unit, a system, a control method, a non-transitory storage medium, and a vehicle that, in a system configuration in which a plurality of ADAS applications are implemented in the same ECU, when any ADAS application out of a plurality of ADAS applications, of which functions are in operation, are in a state where a request from the driver should not be responded, arbitration can be performed so as not to respond to the request from the driver.

A manager according to a first aspect of the present disclosure technique is installed in a vehicle and includes one or more processors. The one or more processors are configured to receive, from a plurality of advanced driver assistance system applications, a plurality of kinematic plans and identification information of the advanced driver assistance system applications, and receive a control status indicating an execution state of control in each of the advanced driver assistance system applications. The one or more processors are configured to perform a first arbitration that arbitrates the kinematic plans.

According to the manager of the first aspect of the present disclosure, the manager receives a control status indicating the execution state of control from each of the advanced driver assistance system (ADAS) applications. Accordingly, in a system configuration in which a plurality of ADAS applications are implemented in the same ECU, when any ADAS application out of a plurality of ADAS applications, of which functions are in operation, are in a state where a request from the driver should not be responded, the manager can perform arbitration so as not to respond to the request from the driver.

In the manager according to the first aspect of the technology of the present disclosure, the one or more processors may be configured to receive a request from a driver, perform a second arbitration that arbitrates the request from the driver and a first arbitration result of the first arbitration, and reject, in the second arbitration, responding to the request from the driver based on the identification information of the advanced driver assistance system application and the control status. In the manager according to the first aspect of the technology according to the present disclosure, the one or more processors may be configured to receive the kinematic plans, the identification information of the advanced driver assistance system applications, and the control status, from one electronic control unit in which two or more of the advanced driver assistance system applications are implemented. In the manager according to the first aspect of the technology of the present disclosure, the two or more of the advanced driver assistance system applications may include an autonomous driving application and a driver assistance application. In the manager according to the first aspect of the technology of the present disclosure, the autonomous driving application may be an automatic parking application being configured to assist parking, the driver assistance application may be a parking support brake application being configured to support a braking operation at a low speed, and the request from the driver may be a request to control setting of a shift range. The manager according to the first aspect of the present disclosure technique may further include a storage configured to store information indicating a relation among the identification information of the advanced driver assistance system application, the control status, and whether the responding to the request from the driver is admissible.

An electronic control unit according to a second aspect of the technology of the present disclosure is installed in a vehicle and implements a plurality of advanced driver assistance system applications. The electronic control unit includes one or more processors configured to output, to a manager, a kinematic plan and identification information of the advanced driver assistance system application selected from the advanced driver assistance system applications, and a control status indicating an execution state of control in at least one of the advanced driver assistance system applications.

A system according to a third aspect of the technology of the present disclosure is installed in a vehicle and includes a plurality of electronic control units in which one or more advanced driver assistance system applications are implemented, and a manager. The electronic control unit includes one or more processors configured to output, to the manager, a kinematic plan and identification information of the advanced driver assistance system application selected from the one or more advanced driver assistance system applications, and a control status indicating an execution state of control in at least one of the advanced driver assistance system applications. The manager includes one or more processors configured to receive each of the kinematic plan, the identification information of the selected advanced driver assistance system application, and the control status, from the electronic control units, and arbitrate a plurality of the kinematic plans.

A control method according to a fourth aspect of the technology of the present disclosure is executed by a computer of a manager installed in a vehicle. The control method includes receiving, from a plurality of advanced driver assistance system applications, a plurality of kinematic plans, identification information of the advanced driver assistance system applications, and a control status indicating an execution state of control in each of the advanced driver assistance system applications, and arbitrating the kinematic plans.

A non-transitory storage medium according to a fifth aspect of the technology according to the present disclosure stores instructions that are executable by a computer of a manager installed in a vehicle and that cause the computer to perform functions. The functions include receiving, from a plurality of advanced driver assistance system applications, a plurality of kinematic plans, identification information of the advanced driver assistance system applications, and a control status indicating an execution state of control in each of the advanced driver assistance system applications, and arbitrating the kinematic plans.

The vehicle according to a sixth aspect of the technology of the present disclosure is a vehicle in which the above manager is installed.

BRIEF DESCRIPTION OF THE DRAWINGS

Features, advantages, and technical and industrial significance of exemplary embodiments of the present disclosure below with reference to the accompanying drawings, in which like signs denote like elements, and wherein.

DETAILED DESCRIPTION OF EMBODIMENTS

A manager according to the present disclosure acquires information indicating the control state of automatic parking functions from an ECU in which at least an automatic parking application and a PKSB application are implemented, in addition to an identification ID of an application that realizes requested functions. The automatic parking control operating behind the PKSB control and so forth can be comprehended from this information, and accordingly the manager can reject responding to driver requests that are undesirable for the automatic parking control. An embodiment of the present disclosure will be described below in detail with reference to the drawings.

Embodiment

Configuration

Figure 1:
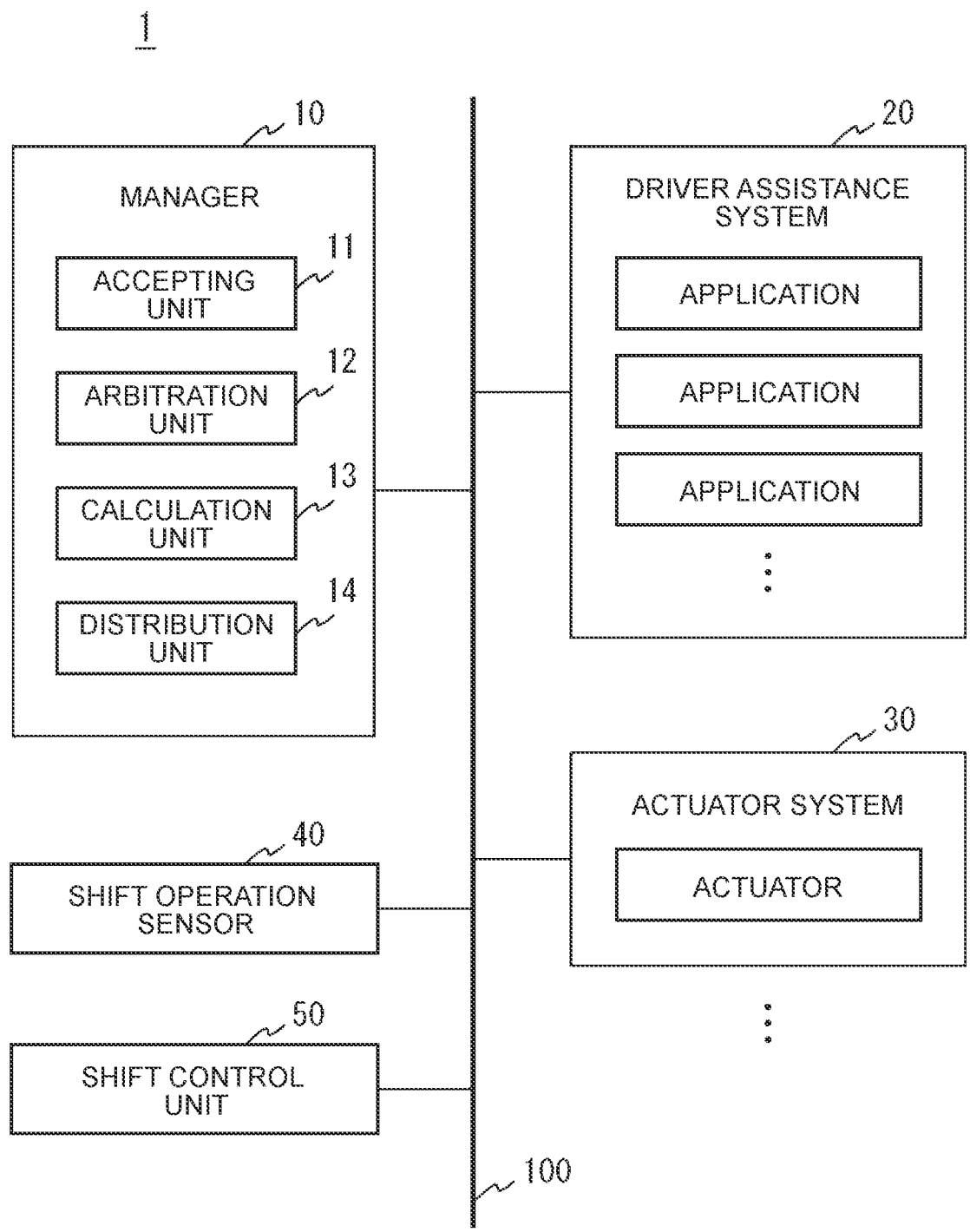
FIG. 1 is a schematic diagram illustrating a configuration example of a system according to an embodiment of the present disclosure.

FIG. 1 is a schematic diagram illustrating a configuration example of a system 1 installed in a vehicle according to the embodiment of the present disclosure. The system 1 illustrated in FIG. 1 includes configurations of a manager 10, a driver assistance system 20, an actuator system 30, a shift operation sensor 40, and a shift control unit 50, each of the configurations being communicably connected via an in-vehicle network 100. Examples of the in-vehicle network 100 include a Controller Area Network (CAN) and Ethernet (registered trademark).

The driver assistance system 20 is a configuration for realizing various types of functions for assisting driving of the vehicle, including at least drive control and braking control of the vehicle, by executing implemented applications. Examples of applications implemented by the driver assistance system 20 include one or a plurality of ADAS applications, such as an automatic driving application that realizes automatic driving functions, and a driver assistance application that realizes various functions related to driver assistance of the vehicle. Automatic driving applications include an automatic parking application that realizes the functions of automatic parking of the vehicle, and so forth. Driver assistance applications include PKSB applications that realize functions of assisting brake operations when traveling at low speeds, such as when parking or the like, applications that realize functions of collision avoidance assistance (pre-crash safety (PCS), etc.), applications that realize functions of following the vehicle in front (adaptive cruise control (ACC), etc.) for travelling while keeping the distance between the vehicle travelling ahead and the vehicle constant, applications that realize functions of lane keeping assistance (lane keeping assist (LKA), lane tracing assist (LTA), etc.) for maintaining the lane that the vehicle is traveling in, applications that realize functions of collision damage mitigation braking (automated emergency braking (AEB), etc.) for automatically braking to reduce damage in a collision, applications that realize functions of lane departure warning (LDW) (lane departure alert (LDA), etc.) for warning of the vehicle deviating from the lane that the vehicle is traveling in, and so forth.

Each application of the driver assistance system 20 outputs a request for a kinematic plan guaranteeing functionality (merchantability) of the application alone to the manager 10, as an application request, based on vehicle information (recognition sensor information, etc.) acquired (input) from various types of sensors and so forth that are omitted from illustration. Examples of the kinematic plans include requests related to longitudinal acceleration/deceleration generated in the vehicle, and requests relating to setting of the shift range (shift range request values). Also, each application of the driver assistance system 20 outputs identification information (application ID) that can uniquely identify its own application to the manager 10 along with the kinematic plan. The application ID is uniquely set in advance for each application. Further, particular applications in the driver assistance system 20 each outputs a control status (control state signal) indicating the control state of the functions of its own application to the manager 10. Particular applications and control status will be described later.

The driver assistance system 20 is realized by a computer such as an electronic control unit (ECU) having a processor such as a central processing unit (CPU), memory, and an input/output interface (output unit). Note that the number of ECUs constituting the driver assistance system 20 and the number of applications implemented by the ECUs are not limited in particular. As an example of the driver assistance system 20, one or a plurality of ECUs in which a plurality of applications are collectively implemented may be provided, or one or a plurality of ECUs in which one application is implemented may be provided. For example, a part or all of the driver assistance system 20 may be configured by an ECU in which both the automatic parking application and the PKSB application are implemented, or the ECU in which the PKSB application is implemented and the ECU in which the automatic parking application is implemented may constitute part or all of the driver assistance system 20.

The actuator system 30 is one of realization systems for realizing requests for kinematic plans output by the driver assistance system 20. Although FIG. 1 illustrates an example in which only one actuator system 30 is connected to the in-vehicle network 100, the number of actuator systems 30 installed in the vehicle is not limited in particular. Examples of the actuator system 30 include a system that includes a brake actuator (such as an electric brake device) capable of generating a braking force in the vehicle and that realizes a request for a kinematic plan (acceleration request) by controlling the operation of the brake actuator, a system that includes a shift actuator capable of operating a shift mechanism and that realizes a request for a kinematic plan (shift range request value) by controlling the operation of the shift actuator.

The shift operation sensor 40 is configured to detect the change of the shift range operated by the driver as a request from the driver of the vehicle. The detection results of the shift operation sensor 40 are output to the manager 10.

The shift control unit 50 is a configuration for controlling the settings of the shift range (shift position) of the vehicle, based on the request from the manager 10 (shift range request value) based on the kinematic plan output by the driver assistance system 20, and/or a request from the driver (shift operation). The shift control unit 50 is incorporated in a shift ECU, for example, to control the shift actuator.

The manager 10 determines control contents related to motion of the vehicle based on a request for a kinematic plan received from the driver assistance system 20, and outputs requests to the actuator system 30 as necessary, based on the determined control contents. Also, the manager 10 gives instructions necessary for performing settings control of the shift range to the shift control unit 50, based on the application ID of the application acquired from the driver assistance system 20 along with the request for the kinematic plan, and the control status of that application.

The manager 10 controls the motion of the vehicle, functioning as an ADAS manager (MGR) or a vehicle MGR or the like involved in so-called vehicle motion, or as a part of an ADAS MGR or a vehicle MGR. The manager 10 includes an receiving unit 11, an arbitration unit 12, a calculation unit 13, and a distribution unit 14.

The receiving unit 11 (first receiving unit) receives requests for kinematic plans, application IDs, and control statuses output by one or a plurality of applications of the driver assistance system 20. Examples of kinematic plans in the present embodiment include acceleration related to the front-rear direction (longitudinal direction) motion of the vehicle, and shift range request values. Also, the receiving unit 11 (second receiving unit) receives the shift operations detected by the shift operation sensor 40 as requests from the driver. The requests for kinematic plans, the application IDs, and the requests by the driver (shift operations) received by the receiving unit 11 are output to the arbitration unit 12.

The arbitration unit 12 (first arbitration unit) arbitrates requests for a plurality of kinematic plans that the receiving unit 11 has received from the applications of the driver assistance system 20. Examples of the processing of this arbitration include one kinematic plan being selected from the kinematic plans based on a predetermined selection criterion (e.g., minimum (Min) selection). Further, a new kinematic plan can be set based on the kinematic plans, as processing of arbitration. Note that the arbitration unit 12 may arbitrate requests for the kinematic plans, further based on information representing availability acquired from the actuator system 30.

Further, the arbitration unit 12 (second arbitration unit) determines whether to respond to a request from the driver (shift operation), based on the control status that the receiving unit 11 has received from the applications of the driver assistance system 20 and the detection results from the shift operation sensor 40. The determination of whether to respond to the request from the driver (determination of maintaining/changing the current state) will be described later. The arbitration unit 12 then gives instructions necessary for controlling of setting the shift range to the shift control unit 50 according to this determination.

The calculation unit 13 calculates a motion request, based on the arbitration results of the requests for the kinematic plans at the arbitration unit 12. This motion request is a physical quantity for controlling the actuator system 30, and is different from the physical quantity of the request for the kinematic plan. For example, when the request for a kinematic plan (first request) is acceleration, driving force and driving torque can be calculated as the motion request (second request). Thus, the request for acceleration is converted into a request for driving force and driving torque.

The distribution unit 14 distributes the motion request calculated by the calculation unit 13 to at least one actuator system (the actuator system 30 and another actuator system that is omitted from illustration).

Note that the configurations of the equipment installed in the vehicle and the configuration of the manager 10 described above are exemplary, and additions, substitutions, changes, omissions, and so forth, can be made as appropriate. Also, the functions of each piece of equipment can be implemented by integration into one piece of equipment or distribution between or among a plurality of pieces of equipment, as appropriate. For example, out of the functions of the receiving unit 11 of the manager 10, functions of receiving the shift operation detected by the shift operation sensor 40 (second receiving unit) may be implemented in a device different from the manager 10, or may be implemented in the shift control unit 50. Also, out of the functions of the arbitration unit 12 of the manager 10, functions of determining whether to respond to a request from the driver based on the control status (second arbitration unit) may be implemented in a device different from the manager 10, or may be implemented in the shift control unit 50.

Control

Figure 2:
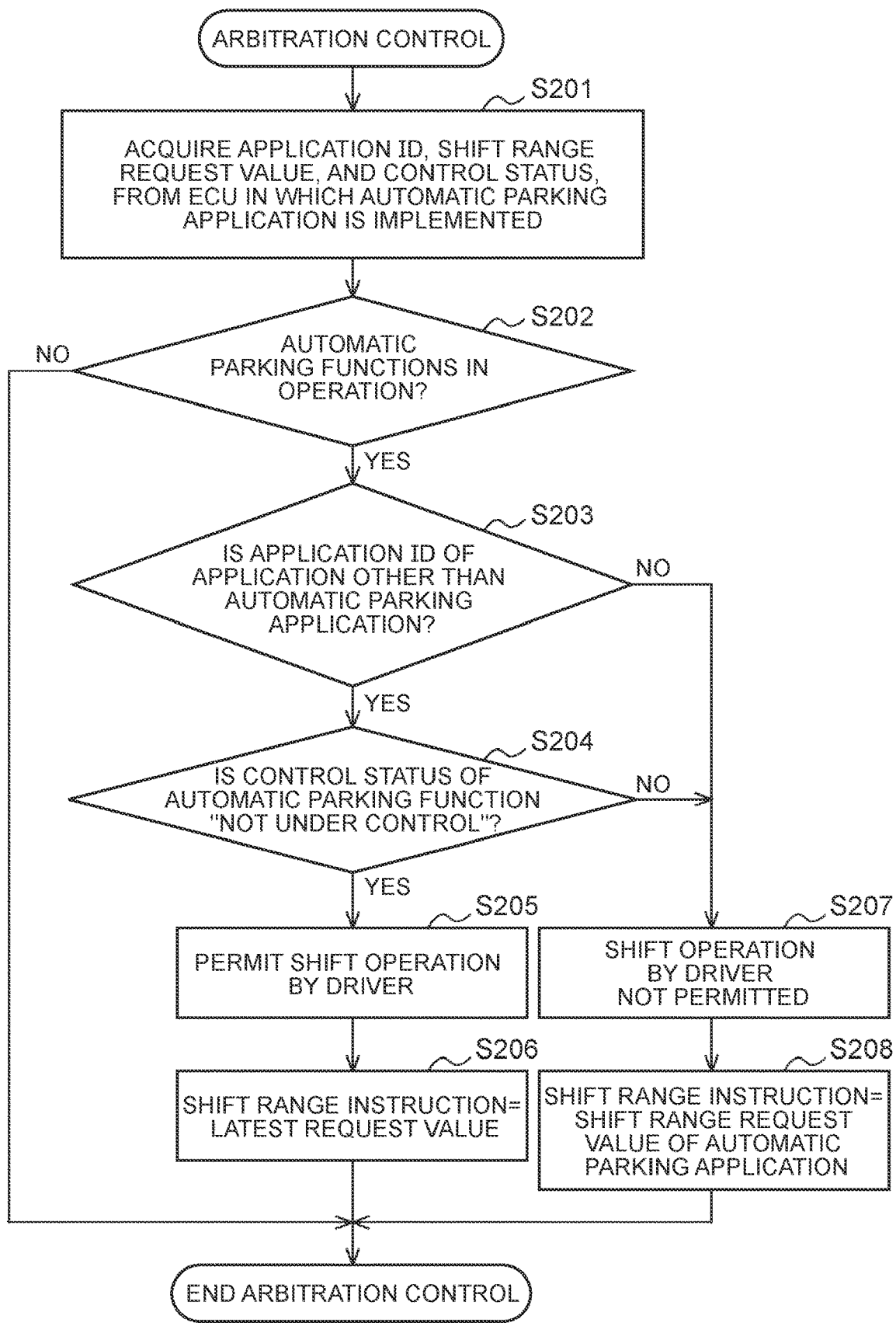
FIG. 2 is a flowchart of a processing procedure of arbitration control executed by an arbitration unit of a manager.

The control executed by the manager 10 according to the present embodiment will be described with reference to FIG. 2. FIG. 2 is a flowchart showing processing procedures of arbitration control relating to the shift range, executed by the arbitration unit 12 of the manager 10. In this flowchart, arbitration control will be described by way of an example in which the request from the driver is a shift operation, and a particular application regarding which there is a state in which a shift request of the own functions should be prioritized over the request from the driver, an application that is not a particular application regarding which the request from the driver is prioritized over the shift request of the own function, are implemented in the same ECU. A shift operation can be exemplified as a request from the driver, an automatic parking application as a particular application, and a PKSB application as an application that is not a particular application, respectively.

The arbitration control shown in FIG. 2 is started, for example, when a shift operation by the driver that is a request from the driver is performed.

Step S201

The arbitration unit 12 acquires, from the ECU in which the automatic parking application is implemented, the application ID of the application by which the ECU requests the manager 10 for a kinematic plan, a shift range request value that the application requests in the kinematic plan, and the control status of the application, via the receiving unit 11. The control status to be acquired includes at least a control status indicating the control state of the automatic parking function realized by the automatic parking application that is a particular application. Note that the arbitration unit 12 may acquire the control status of all the applications implemented in the ECU. The arbitration unit 12 acquires the application ID, the shift range request value, and the control status from the ECU, not only when the driver makes a request, but also whenever there is necessity for arbitration. When the application ID, the shift range request value, and the control status are acquired from the ECU in which the automatic parking application is implemented, the processing proceeds to step S202.

Examples of the control status of the automatic parking function include "not under control" indicating a state in which the automatic parking function is not operating, "under control" indicating a state in which the automatic parking function is operating, "control suspended" indicating a state in which the automatic parking function is operating but processing is temporarily suspended, and "control ending processing underway" indicating a state in which post-processing is being executed up to traveling of the vehicle by the automatic parking function being completed and the operations being ended. Note that categorization of control statuses is not limited to those above. For example, "control start processing underway" indicating a state in which pre-processing up to the vehicle starting to travel by operating the automatic parking function is being executed, may be newly added to the control status category, and "control ending processing underway" may be set as a control status included in the "under control" category.

Step S202

The arbitration unit 12 determines whether the automatic parking functions realized by the automatic parking application are in operation. This determination may be made depending on whether the application ID acquired from the ECU belongs to the automatic parking application, or may be made depending on whether the control status of the automatic parking function acquired from the ECU is any one of "under control", "control suspended", and "control ending processing underway". When the arbitration unit 12 determines that the automatic parking functions are in operation (YES in step S202), the processing proceeds to step S203, and when determining that the automatic parking functions are not in operation (NO in step S202), the arbitration control ends.

Step S203

The arbitration unit 12 determines whether the application ID acquired from the ECU in which the automatic parking application is implemented is for an application other than the automatic parking application (PKSB application, etc.). For example, when another function is selected while the automatic parking function is operating (intervening by another control), the application ID will temporarily become that of an application other than the automatic parking application. When the arbitration unit 12 determines that the application ID belongs to an application other than the automatic parking application (YES in step S203), the processing proceeds to step S204, since whether the automatic parking function is stopped or operating cannot be comprehended from the application ID. On the other hand, when the arbitration unit 12 determines that the application ID does not belong to an application other than the automatic parking application (NO in step S203), the application ID belongs to the automatic parking application, and accordingly the processing proceeds to step S207.

Step S204

The arbitration unit 12 determines whether the control status of the automatic parking function is "not under control". When the arbitration unit 12 determines that the control status is "not under control" (YES in step S204), the automatic parking function is not activated and requests from the driver can be accepted, and accordingly the processing proceeds to step S205. On the other hand, when the arbitration unit 12 determines that the control status is not "not under control" (NO in step S204), the automatic parking function is operated, requests from the driver cannot be accepted (priority is given to the automatic parking functions), and accordingly the processing proceeds to step S207.

Step S205

The arbitration unit 12 permits the shift operation by the driver that is a request from the driver. Subsequently, the processing proceeds to step S206.

Step S206

The arbitration unit 12 sets the shift range to be instructed to the shift control unit 50 to the latest requested value. The latest requested value is set based on arbitration between the shift range request value requested by an application other than the automatic parking application (PKSB application, etc.) and the requested value according to the shift operation performed by the driver. Upon the shift range instruction being set, the arbitration control ends.

Step S207

The arbitration unit 12 does not permit the shift operation by the driver that is a request from the driver (not permitted). Subsequently, the processing proceeds to step S208.

Step S208

The arbitration unit 12 sets the shift range to be instructed to the shift control unit 50 to the shift range request value requested by the automatic parking application. Upon the shift range instruction being set, the arbitration control ends.

Operations and Effects

As described above, in the system according to the embodiment of the present disclosure, when a particular application (automatic parking application) regarding which there is a state in which a request of the own functions (shift range request) should be prioritized over the request from the driver (shift operation by driver), and an application that is not a particular application (PKSB application) regarding which the request of from the driver is prioritized over the request of the own function (shift range request), are implemented in the same ECU, the ECU can constantly output the control status indicating the control state of the functions realized by the particular application (automatic parking functions) to the manager.

By this control status, the manager can readily comprehend that the function (automatic parking function) of the particular application is operating in the background of the function control (PKSB control) realized by the application that is not a particular application. Accordingly, the manager can reject responding to the request input from the driver even when the application ID of the particular application has not been acquired.

In the above embodiment, the automatic parking application has been described as an application regarding which there is a state in which the request for own functions should be prioritized over the request from the driver. However, the same processing can be applied regarding applications other than the automatic parking application (e.g., an automatic driving application), when there is a state in which the request of the own functions should be prioritized over the request from the driver.

Note that in the case of a system in which a plurality of application IDs respectively corresponding to a plurality of applications operating in one ECU can be output from the ECU to the manager, the ECU may output, to the manager, application IDs instead of the control status. Also, when the ECU outputs the application ID to the manager, adding information regarding whether to respond to a particular driver request to the function of the application ID, and the manager storing and holding the information in a storage unit or the like, enables the same processing to be carried out.

Although the embodiment of the technology according to the present disclosure has been described above, the present disclosure is not limited to a manager installed in a vehicle, and can be understood as being an electronic control unit, a system including an electronic control unit and a manager, a control method executed by a manager including a processor and memory, a control program, a computer-readable non-transitory storage medium storing the control program, a vehicle provided with the manager, and so forth.

The present disclosure is useful in managers and the like installed in vehicles and so forth.

What is claimed is:

1. A vehicle comprising:
a first electronic control unit in which an advanced driver assistance system for an autonomous driving application is implemented, the first electronic control unit including a first processor;
a second electronic control unit in which a driver assistance application is implemented based upon a request from a driver, the second electronic control unit including a second processor;
a manager including a third processor; and
an in-vehicle network configured to allow electronic communication between the first electronic control unit, the second electronic control unit and the manager; wherein:
the first electronic control unit and the second electronic control unit are each configured to output, respectively, to the manager, a kinematic plan and identification information, and a control status indicating a respective execution state of control; and
the manager is configured to
receive each of the kinematic plan and the identification information, and the respective execution state,
arbitrate the kinematic plan of the kinematic plan of the first electronic control unit and the kinematic plan of the second control unit and determine that the result of the arbitration is that the kinematic plan of the first electronic control unit has priority because the autonomous driving application has priority over the request from the driver, and
send an arbitration result to the first electronic control unit and the second electronic control unit causing the kinematic plan of the first electronic control unit to be executed by the vehicle and causing the kinematic plan of the second electronic control unit not to be executed.

2. The vehicle according to claim 1, wherein:
the autonomous driving application is an automatic parking application configured to assist parking;
the driver assistance application is a parking support brake application configured to support a braking operation at a low speed; and
the request from the driver is to control setting of a shift range.

3. The vehicle according to claim 1, further comprising a storage configured to store information indicating a relation among the identification information, the control status, and whether responding to the request from the driver is admissible.

4. A vehicle control method for a vehicle that includes (a) a first electronic control unit in which an advanced driver assistance system for an autonomous driving application is implemented, the first electronic control unit including a first processor, (b) a second electronic control unit in which a driver assistance application is implemented based upon a request from a driver, the second electronic control unit including a second processor, and (c) a manager including a third processor, the method being executed by one or more of the first processor, the second processor, and the third processor and comprising:
receiving a plurality of kinematic plans, identification information, and a respective execution state from the first electronic control unit and the second electronic control unit; and
arbitrating the kinematic plan of the first electronic control unit and the kinematic plan of the second control unit and determine that the result of the arbitration is that the kinematic plan of the first electronic control unit has priority because the autonomous driving application has priority over the request from the driver, and send an arbitration result to the first electronic control unit and the second electronic control unit causing the kinematic plan of the first electronic control unit to be executed by the vehicle and causing the kinematic plan of the second electronic control unit not to be executed.

\* \* \* \* \*